US012657569B2

(12) United States Patent
Liao et al.

(10) Patent No.: US 12,657,569 B2
(45) Date of Patent: Jun. 16, 2026

(54) SENDING AGGREGATION-CODE-BASED PAYMENT PAGES

(71) Applicant: Alipay.com Co., Ltd., Shanghai (CN)

(72) Inventors: Lingfei Liao, Shanghai (CN); Zhihui Tang, Shanghai (CN); Shengqun Zou, Shanghai (CN)

(73) Assignee: Alipay.com Co., Ltd., Shanghai (CN)

( * ) Notice: Subject to any disclaimer, the term of this patent is extended or adjusted under 35 U.S.C. 154(b) by 69 days.

(21) Appl. No.: 18/399,171

(22) Filed: Dec. 28, 2023

(65) Prior Publication Data

US 2024/0135358 A1    Apr. 25, 2024
US 2024/0232852 A9    Jul. 11, 2024

Related U.S. Application Data

(63) Continuation of application No. PCT/CN2022/102960, filed on Jun. 30, 2022.

(30) Foreign Application Priority Data

Jul. 12, 2021    (CN) .......................... 202110783759.1

(51) Int. Cl.
G06Q 20/32        (2012.01)
G06Q 20/10        (2012.01)

(52) U.S. Cl.
CPC ....... G06Q 20/3276 (2013.01); G06Q 20/102 (2013.01)

(58) Field of Classification Search
None
See application file for complete search history.

(56) References Cited

U.S. PATENT DOCUMENTS 9,825,965 B2 *  11/2017  Cinarkaya ........... G06F 16/9566
2010/0010908 A1   1/2010  Pasupulati et al.
2011/0282788 A1  11/2011  Allison, Jr. et al.
2014/0279426 A1   9/2014  Holman et al.
(Continued)

FOREIGN PATENT DOCUMENTS

CN        105607910 A  *  5/2016  ............... G06F 8/38
CN        105631650 A  *  6/2016  ............. G06Q 20/38
(Continued)

OTHER PUBLICATIONS

Google Patents English Language Translation of WO-2020233223-A1. https://patents.google.com/patent/WO2020233223A1/en?oq=WO-2020233223-A1 (Year: 2025).*
(Continued)

*Primary Examiner* — Ayal I. Sharon
(74) *Attorney, Agent, or Firm* — Fish & Richardson P.C.

(57)        ABSTRACT

This specification discloses methods, apparatus, devices, and systems for sending payment pages based on aggregation codes. In one implementation, a method includes: receiving code information obtained by the terminal device from scanning an aggregation code, obtaining a standard payment page corresponding to the code information, where the standard payment page comprises page information generated by the first server based on a historical payment page, and where the historical payment page is provided by a second server for the target aggregation code, and sending the standard payment page to the terminal device.

17 Claims, 6 Drawing Sheets

(56) References Cited

U.S. PATENT DOCUMENTS

| | | | | |
|---|---|---|---|---|
| 2018/0225671 A1* | 8/2018 | Brown | ............... | H04L 63/0861 |
| 2018/0232718 A1* | 8/2018 | Brown | ................. | G06Q 20/363 |
| 2018/0232817 A1 | 8/2018 | Isaacson et al. | | |
| 2019/0287109 A1* | 9/2019 | Brown | .................. | H04L 63/101 |
| 2022/0215374 A1* | 7/2022 | Lu | ...................... | G06Q 30/0635 |
| 2023/0353546 A1* | 11/2023 | Barnett | .............. | H04L 63/0428 |
| 2024/0135358 A1* | 4/2024 | Liao | ........................ | G06Q 20/12 |
| 2024/0232852 A9* | 7/2024 | Liao | ...................... | G06F 16/972 |
| 2024/0273508 A1* | 8/2024 | Zou | ........................ | G06Q 20/12 |

FOREIGN PATENT DOCUMENTS

| | | | | |
|---|---|---|---|---|
| CN | 105913245 | 8/2016 | | |
| CN | 108596596 | 9/2018 | | |
| CN | 109102267 | 12/2018 | | |
| CN | 110647697 | 1/2020 | | |
| CN | 111062713 | 4/2020 | | |
| CN | 111160884 | 5/2020 | | |
| CN | 111179061 | 5/2020 | | |
| CN | 111429128 | 7/2020 | | |
| CN | 112215599 | 1/2021 | | |
| CN | 112232804 | 4/2021 | | |
| CN | 113435880 | 9/2021 | | |
| CN | 117787966 | 3/2024 | | |
| RU | 2630166 C1 * | 9/2017 | ............ | G06Q 20/32 |
| WO | WO 2015/175619 | 11/2015 | | |
| WO | WO-2019191365 A1 * | 10/2019 | | |
| WO | WO-2020233223 A1 * | 11/2020 | .......... | G06Q 20/027 |
| WO | WO 2021/003607 | 1/2021 | | |
| WO | WO 2023/284558 | 1/2023 | | |
| WO | WO-2023124107 A1 * | 7/2023 | ......... | G06F 16/2457 |
| WO | WO-2023236512 A1 * | 12/2023 | | |

OTHER PUBLICATIONS

Google Patents English Language Translation of WO-2023236512-A1. https://patents.google.com/patent/WO2023236512A1/en?oq=WO-2023236512-A1 (Year: 2025).*

Google Patents English Language Translation of WO-2023124107-A1. https://patents.google.com/patent/WO2023124107A1/en?oq=WO-2023124107-A1 (Year: 2025).*

Google Patents English Language Translation of RU-2630166-C1. Published on Sep. 5, 2017. https://patents.google.com/patent/RU2630166C1/en?oq=RU-2630166-C1 (Year: 2017).*

Google Patents English Language Translation of CN-105631650-A. Published on Jun. 1, 2016. https://patents.google.com/patent/CN105631650A/en?oq=CN-105631650-A (Year: 2016).*

Google Patents English Language Translation of CN-105607910-A. Published on May 25, 2016. https://patents.google.com/patent/CN105607910A/en?oq=CN-105607910-A (Year: 2016).*

Crosby et al., "BlockChain Technology: Beyond Bitcoin," Sutardja Center for Entrepreneurship & Technology Technical Report, Oct. 16, 2015, 35 pages.

International Preliminary Report on Patentability in International Appln. No. PCT/CN2022/102960, mailed on Jan. 25, 2024, 12 pages (with English translation).

International Search Report and Written Opinion in International Appln. No. PCT/CN2022/102960, mailed on Sep. 30, 2022, 16 pages (with English translation).

Nakamoto, "Bitcoin: A Peer-to-Peer Electronic Cash System," www.bitcoin.org, 2008, 9 pages.

Extended European Search Report in European Appln. No. 22841196.3, mailed on Jul. 8, 2024, 8 pages.

* cited by examiner

700

730

Memory

720

Instructions

710

Processor

SENDING AGGREGATION-CODE-BASED PAYMENT PAGES

CROSS-REFERENCE TO RELATED APPLICATIONS

This application is a continuation of PCT Application No. PCT/CN2022/102960, filed on Jun. 30, 2022, which claims priority to Chinese Patent Application No. 202110783759.1, filed on Jul. 12, 2021, and each application is hereby incorporated by reference in its entirety.

TECHNICAL FIELD

This application relates to the field of computer technologies, and in particular, to sending aggregation-code-based payment pages.

BACKGROUND

With the development of computer technologies, more users use "scan code to pay". To facilitate the users to make payment operations and reduce limitations on payment modes, aggregation payment codes (hereafter referred to as aggregation codes) emerge. The aggregation payment codes are collection codes that integrate a plurality of payment channels, and can simultaneously support payment tools of integrated channels for code scanning payment. For example, some aggregation payment codes can support mainstream payment tools such as ALIPAY, WECHAT PAY, BAIDU WALLET, and UNIONPAY for code scanning payment.

Currently, after the users scan the aggregation payment codes, servers of management organizations of the aggregation payment codes process code scanning requests of the users, and provide the users payment pages generated based on the aggregation codes, so the users fill in information such as payment amounts and payment modes on the payment pages to complete payment. The servers can generate aggregation payment pages in different layouts for different aggregation payment codes. There is the status of page layout confusion. Consequently, user experience is poor, and efficiency of payment based on the aggregation codes is also affected.

Therefore, how to improve the user experience and improve the efficiency of payment based on the aggregation codes are urgent technical problems to be solved.

SUMMARY

Embodiments of this specification provide methods, apparatuses, and devices for sending aggregation-code-based payment pages, and media, to alleviate an existing problem of confusing layouts of aggregation payment pages.

To alleviate the previous technical problem, the embodiments of this specification are implemented as follows: A method for sending an aggregation-code-based payment page provided in an embodiment of this specification includes the following: A first server obtains code information obtained by scanning a target aggregation code by a terminal device; obtains a standard payment page in a predetermined format corresponding to the code information, where page information included in the standard payment page is obtained by the first server from page information of a historical payment page provided by a second server for the target aggregation code; and sends the standard payment page to the terminal device.

An apparatus for sending an aggregation-code-based payment page provided in an embodiment of this specification includes: an information acquisition module, configured to obtain code information obtained by scanning a target aggregation code by a terminal device; a page acquisition module, configured to obtain a standard payment page in a predetermined format corresponding to the code information, where page information included in the standard payment page is obtained by a first server from page information of a historical payment page provided by a second server for the target aggregation code; and a sending module, configured to send the standard payment page to the terminal device.

A device for sending an aggregation-code-based payment page provided in an embodiment of this specification includes at least one processor, and a memory communicatively connected to the at least one processor. The memory stores instructions that can be executed by the at least one processor. The instructions are executed by the at least one processor to enable the at least one processor to: obtain code information obtained by scanning a target aggregation code by a terminal device; obtain a standard payment page in a predetermined format corresponding to the code information, where page information included in the standard payment page is obtained by a first server from page information of a historical payment page provided by a second server for the target aggregation code; and send the standard payment page to the terminal device.

An embodiment of this specification provides a computer-readable medium, computer-readable instructions are stored on the computer-readable medium, and the computer-readable instructions can be executed by a processor to implement the method for sending an aggregation-code-based payment page.

This embodiment of this specification can achieve the following beneficial effects: In this embodiment of this specification, the first server can obtain the standard payment page in the predetermined format corresponding to the code information of the target aggregation code, and send the standard payment page to the terminal device. Therefore, a user of the terminal device can input payment information on the standard payment page to complete aggregation payment. By using the standard payment page in the predetermined format, an aggregation payment page used by the user to input the payment information can be standardized, to reduce a phenomenon of a confusing page layout of an aggregation payment page in the existing technology. Therefore, user experience can be improved, and payment efficiency can be improved.

BRIEF DESCRIPTION OF DRAWINGS

To describe the technical solutions in some embodiments of this specification or in the existing technology more clearly, the following briefly describes the accompanying drawings needed for describing the embodiments or the existing technology. Clearly, the accompanying drawings in the following descriptions merely show some embodiments of this application, and a person of ordinary skill in the art can still derive other drawings from these accompanying drawings without creative efforts.

3

Figure 2:
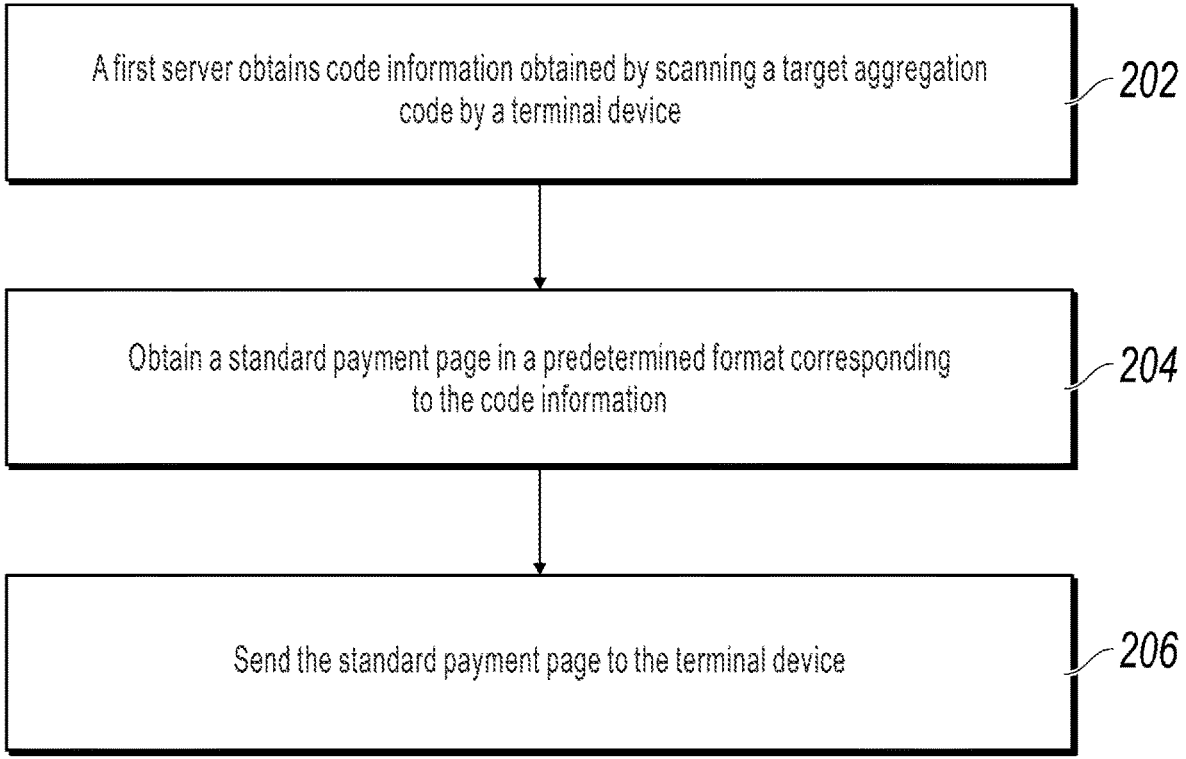
Figure 3:
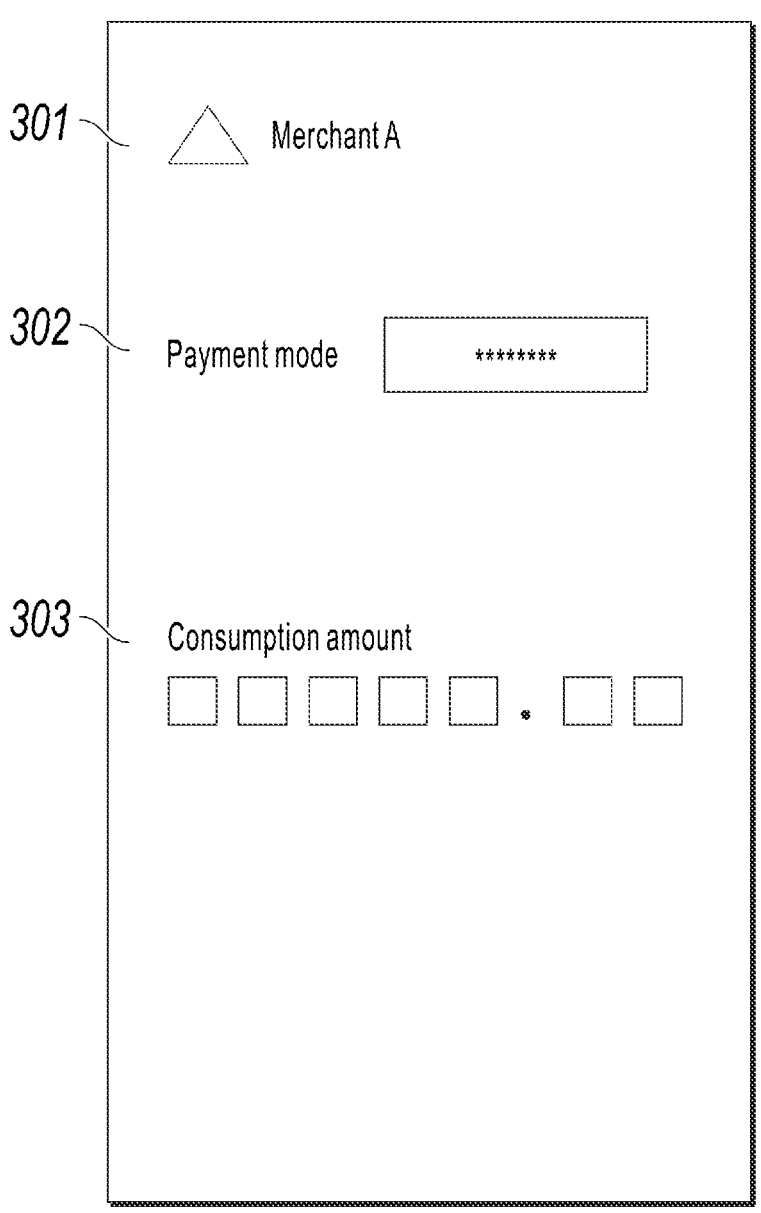
Figure 4:
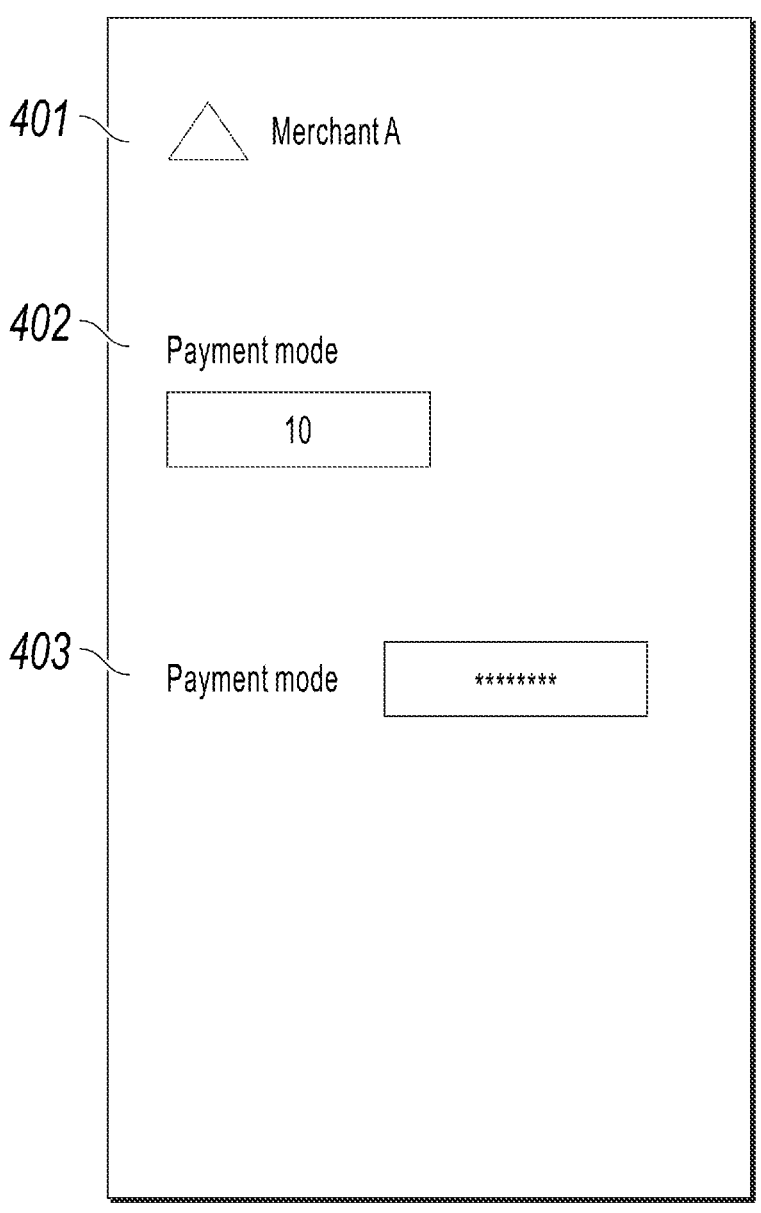
Figure 5:
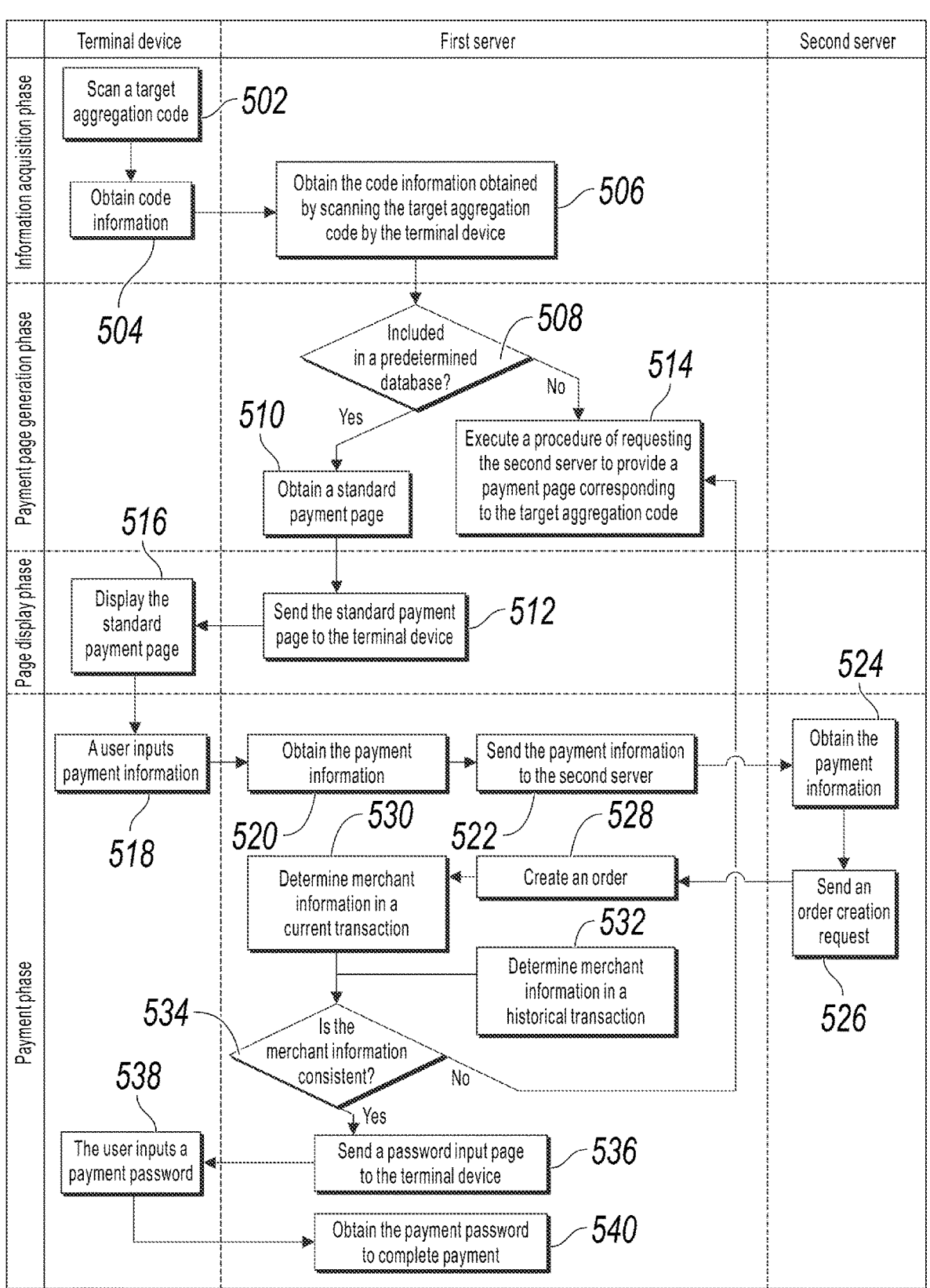
Figure 6:
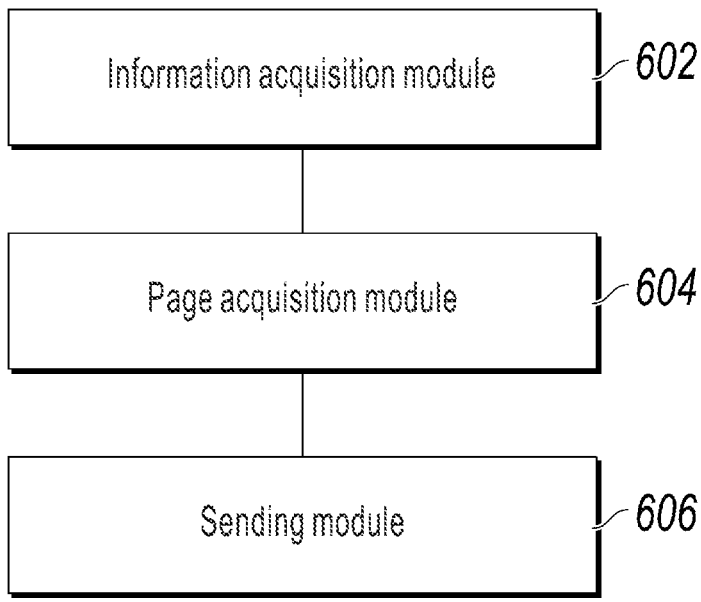
Figure 7:
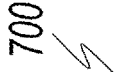

FIG. 2 is a schematic flowchart illustrating a method for sending an aggregation-code-based payment page, according to an embodiment of this specification;

FIG. 3 is a schematic diagram illustrating a historical payment page provided by a second service, according to an embodiment of this specification;

FIG. 4 is a schematic diagram illustrating a standard payment page, according to an embodiment of this specification;

FIG. 5 is a swimlane diagram illustrating a method for sending an aggregation-code-based payment page, according to an embodiment of this specification;

FIG. 6 is a schematic structural diagram illustrating an apparatus for sending an aggregation-code-based payment page, according to an embodiment of this specification; and FIG. 7 is a schematic structural diagram illustrating a device for sending an aggregation-code-based payment page, according to an embodiment of this specification.

DESCRIPTION OF EMBODIMENTS

To make the objectives, technical solutions, and advantages of one or more embodiments of this specification clearer, the following clearly and comprehensively describes the technical solutions in one or more embodiments of this specification with reference to some specific embodiments of this specification and the corresponding accompanying drawings. Clearly, the described embodiments are merely some but not all of embodiments of this specification. All other embodiments obtained by a person of ordinary skill in the art based on some embodiments of this specification without creative efforts shall fall within the protection scope of one or more embodiments of this specification.

The following describes in detail the technical solutions provided in some embodiments of this specification with reference to the accompanying drawings.

In the existing technology, after a user scans an aggregation payment code, a terminal device interacts with a server of a management organization of the aggregation payment code, to obtain a payment page provided by the server. For different code scanning users or different aggregation payment codes, the server can provide payment pages in different layouts. The users need to adapt to the payment pages in the different layouts, which affects payment operations of the users. Consequently, user experience is relatively poor.

The aggregation payment code is a collection code that integrates a plurality of payment channels, and can also be referred to as an aggregation code.

Figure 1:
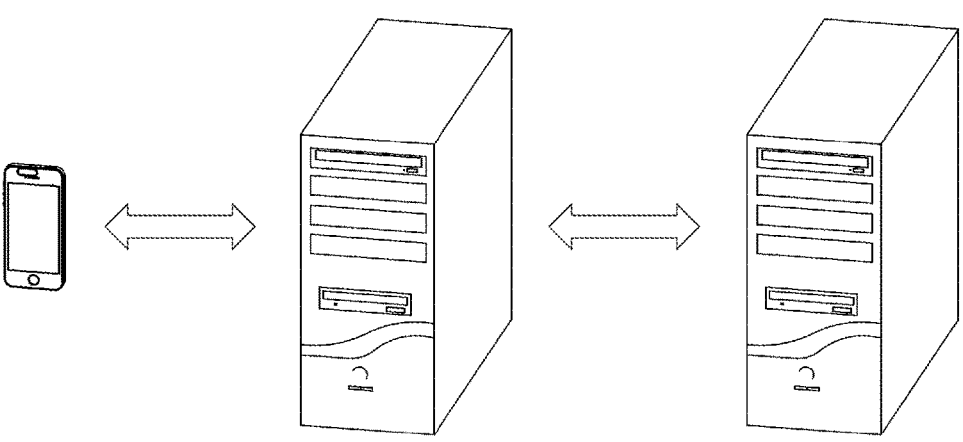
FIG. 1 is a schematic diagram illustrating an application scenario of a method for sending an aggregation-code-based payment page, according to an embodiment of this specification.

To overcome a disadvantage in the existing technology, the solutions provide the following embodiments. FIG. 1 is a schematic diagram illustrating an application scenario of a method for sending an aggregation-code-based payment page, according to an embodiment of this specification. As shown in FIG. 1, the solution can include a terminal device 1, a first server 2, and a second server 3. In practice, a merchant can apply for an aggregation payment code used for collection, and the user scans the aggregate payment code by using a terminal device to complete payment to the merchant. The user can scan the aggregation code by using a certain application program with a payment function in the terminal device 1. The first server 2 corresponding to the application program can receive code information of the aggregation code scanned by the terminal device 1, determine a standard payment page in a predetermined format corresponding to the code information, and feed back the standard payment page to the terminal device 1. The second server 3 can be a server of an organization generating or managing an aggregation code. In the existing technology, after the terminal device scans the aggregation code, the terminal device can interact with the second server, and the second server generates a payment page corresponding to the aggregation code based on access of the terminal device. In this embodiment of this specification, the standard payment page provided by the first terminal device 1 can be generated based on a historical payment page generated by the second server 3. The historical payment page can be a payment page generated by the second server 3 for a historical code scanning operation before the first server 2 obtains the code information scanned by the current terminal device.

The following specifically describes, with reference to the accompanying drawings, the method for sending an aggregation-code-based payment page provided in the embodiments of this specification. FIG. 2 is a schematic flowchart illustrating a method for sending an aggregation-code-based payment page, according to an embodiment of this specification. From a program perspective, the procedure can be executed by a program or an application client device mounted on an application server.

As shown in FIG. 2, the procedure can include the following steps: Step 202: A first server obtains code information obtained by scanning a target aggregation code by a terminal device.

In practice, a user can scan the target aggregation code by using an application program with a payment function in the terminal device. The first server can be a server corresponding to the application program scanning the target aggregation code, and can process a task related to the application program. The target aggregation code can be a collection code provided by a payee. The user can select a payment mode supported by the target aggregation code for payment.

Step 204: Obtain a standard payment page in a predetermined format corresponding to the code information, where page information included in the standard payment page is obtained by the first server from page information of a historical payment page provided by a second server for the target aggregation code.

In this embodiment of this specification, the standard payment page in the predetermined format can be generated in advance based on the historical payment page provided by the second service for the target aggregation code.

In practice, the second server can be a server that manages the target aggregation code, for example, UNIONPAY or a certain bank server, or a third-party organization server. In the existing technology, the terminal device can access an access address specified by the second server after scanning an aggregation code. The second server can generate, based on access of the terminal device, a payment page corresponding to the aggregation code scanned by the terminal device, and feed back the payment page to the terminal device. The user of the terminal device can make payment based on the payment page.

In practice, at least one of the first server and the second server can be an independent server, or can be a server cluster, or can be a server in a server cluster. This is described in terms of a function here, and a specific form is not limited here.

Step 206: Send the standard payment page to the terminal device.

In this embodiment of this specification, the user scans the target aggregation code by using the terminal device, and can obtain the standard payment page, input information such as a payment amount and a payment mode on the standard payment page, and complete aggregation payment for the target aggregation code based on the standard payment page.

It should be understood that in the methods described in one or more embodiments of this specification, orders of some steps can be exchanged based on actual needs, or some steps can be omitted or deleted.

Based on the method in FIG. 2, the first server can obtain the standard payment page in the predetermined format corresponding to the code information of the target aggregation code, and send the standard payment page to the terminal device. Therefore, the user of the terminal device can input payment information on the standard payment page to complete the aggregation payment. By using the standard payment page in the predetermined format, an aggregation payment page used by the user to input the payment information can be standardized, to reduce a phenomenon of a confusing page layout of an aggregation payment page in the existing technology. Therefore, user experience can be improved, and payment efficiency can be improved.

Based on the method in FIG. 2, the embodiments of this specification further provide some specific implementation solutions of the method, which are described below.

In this embodiment of this specification, the standard payment page corresponding to the target aggregation code can be generated in advance based on the historical payment page. Specifically, before step 204 of obtaining a standard payment page in a predetermined format corresponding to the code information, the method can further include: obtaining the historical payment page that corresponds to the target aggregation code and that is provided by the second server; crawling a page element in the historical payment page from the historical payment page; determining a standard page element included in the standard payment page from the page element; and obtaining the page information of the standard payment page based on the standard page element.

In practice, web information crawling tools can be used, for example, a web crawler and a page crawler tool. The page element can include information such as a name of an organization corresponding to the target aggregation code, payee information, and indication information indicating to input an amount to be paid, and can further include information about payment mode selection (selecting ANT CREDIT PAY, a bank card, and an account balance), etc. For example, the organization name can be a name of an organization generating the target aggregation code or an organization name corresponding to a collection account, for example, a certain bank name. The payee information can be a name, a short name, a merchant identifier, etc. of a merchant applying for an aggregation code. The indication information indicating to input an amount to be paid can be prompt information for prompting the user to input a payment amount, or can be an input box for inputting a payment amount, etc. The payment mode selection can be to indicate the user to select a payment mode. For example, the user can select to use at least one of modes of ANT CREDIT PAY, a certain bank card, an account balance, etc. to make payment.

In practice, at least a part of a captured page element can be used as the standard page element of the standard payment page, or some forms of the captured page element can be changed. For example, formats such as a font, a color, and a position are changed to obtain the standard page element. A specific case can be set based on an actual need, and is not specifically limited here.

In this embodiment of this specification, format conversion can be performed on the page element based on a predetermined rule, to obtain a converted page element. The standard payment page is obtained from the converted page element.

To improve accuracy of the standard payment page and avoid omitting information in a payment page provided by the second server, in this embodiment of this specification, the standard payment page can be generated based on a historical payment page last generated by the second server. Specifically, in this embodiment of this specification, the historical payment page can be a payment page last generated by the second server for the target aggregation code.

In practice, the second server can generate historical payment page information for a historical code scanning terminal device and for a code scanning payment request of the historical code scanning terminal device for scanning the target aggregation code. The historical code scanning terminal device can be a terminal device that scans the target aggregation code to perform code scanning payment before a current terminal device scans the target aggregation code. The payment page last generated can be understood as a payment page of the most recent historical payment from the current terminal device scanning the target aggregation code.

To improve validity of standard page information, in this embodiment of this specification, a change of the historical payment page corresponding to the target aggregation code can be further monitored. If the historical payment page does not change within a predetermined time period, it can indicate that the historical payment page provided by the second server is stable. Generating the standard payment page based on the stable historical payment page can improve validity of the standard payment page. Specifically, the method in this embodiment of this specification can further include: obtaining a plurality of historical payment pages generated by the second server in the predetermined time period, where the predetermined time period is a time period of predetermined duration before the first server obtains the code information obtained by scanning the target aggregation code by the terminal device; and determining whether display content of each of the plurality of historical payment pages is the same, to obtain a first determining result. The obtaining a historical payment page that corresponds to the target aggregation code and that is provided by the second server specifically includes: obtaining at least one of the plurality of historical payment pages if the first determining result indicates that the display content of each of the plurality of historical payment pages is the same.

In this embodiment of this specification, construction of the standard payment page corresponding to the code information is suspended if the first determining result indicates that the display content of each of the plurality of historical payment pages is not completely the same. Historical payment pages generated by the second server can also be continuously obtained regularly or irregularly. As time goes by, the standard payment page can be obtained based on the historical payment page if the display content of each of the plurality of historical payment pages is the same within the predetermined time period or display content of recent historical payment pages of a predetermined quantity of times is the same.

In this embodiment of this specification, the standard page element included in the standard payment page can be further stored in a predetermined database and obtained when needed, after the standard page element included in the standard payment page is determined from the page element in this embodiment of this specification, the method can further specifically include: establishing a correspondence between the standard page element and the code information; and saving the code information, the standard page element, and the correspondence between the page element and the code information to the predetermined database.

Step 204 of obtaining a standard payment page in a predetermined format corresponding to the code information can specifically include: obtaining the standard payment page in the predetermined format corresponding to the code information from the predetermined database based on the code information.

In this embodiment of this specification, a page template of the standard payment page can be predetermined, and a display position of the page element can be set in the page template. Specifically, in this embodiment of this specification, the obtaining a standard payment page corresponding to the code information specifically includes: obtaining a predetermined standard payment page template corresponding to the code information, where the predetermined standard payment page template includes display position information of the standard page element; and adding the standard page element to a corresponding position in the predetermined standard payment page template based on the display position information, to obtain the standard payment page.

FIG. 3 is a schematic diagram illustrating a historical payment page provided by a second service, according to an embodiment of this specification. As shown in FIG. 3, the payment page includes a merchant logo and a name "merchant A" 301, a payment mode selection item 302, and a consumption amount indication information and amount input box 303. The payment mode selection item 302 is located above the consumption amount indication information and amount input box 303. The payment amount input box is divided into an integer input part and a decimal input part in a unit of CNY Yuan, separated by a dot in the middle. A numerical value input by the user is displayed on the page in a sequence from left to right in the input box when the user inputs an amount. If the user needs to input CNY 10, the user needs to input "0001000", and the input box displays "00010.00", indicating a payment amount of CNY 10.

FIG. 4 is a schematic diagram of a standard payment page according to an embodiment of this specification. The standard payment page can be a standard payment page generated based on the historical payment page shown in FIG. 3. As shown in FIG. 4, the page includes a standard merchant logo and a name "merchant A" 401, a standard payment amount indication information and amount input box 402, and a standard payment mode selection item 403. The standard payment mode selection item 403 is located below the standard payment amount indication information and amount input box 402. Payment amount indication information is displayed as a "payment amount", which has the same meaning as the "consumption amount" shown in FIG. 3. In addition, the amount input box in FIG. 4 is a whole amount input box, and can be in a unit of CNY Yuan. If needing to input 10 Yuan, the user inputs "10" in the input box.

In this embodiment of this specification, the user can be provided with the standard payment page that is more compliant with an operation habit of the user, which can improve experience of the user during aggregation payment.

To more quickly provide the standard payment page for the user, the predetermined database in this embodiment of this specification can further be a database arranged by using a content delivery network (CDN) architecture. Resource files including the page element of the standard payment page, for example, a js file and a css file, can be stored in the CDN network. A loading speed is fast.

To ensure data security, the predetermined database can further be a blockchain system, and the blockchain system is used to store related information of the standard payment page.

In this embodiment of this specification, the first server obtains the code information obtained by scanning the target aggregation code by the terminal device; and based on the code information, can further simulate a process in which the terminal device accesses the second server by using a built-in browser, interact with the second server in place of the terminal device, and obtain the payment page generated by the second server based on the code information for the target aggregation code scanned by the current terminal device. Specifically, in this embodiment of this specification, before the step of sending the standard payment page to the terminal device, the method can further include the following: The first server determines, based on the code information, a first access address that is included in the code information and that is used to access the second server; and obtains, based on the first access address, an original payment page address provided by the second server for a current payment process, where the current original payment page address is generated by the second server based on access of the first server to the first access address. After the step of sending the standard payment page to the terminal device, the method further includes: obtaining payment information input by the user on the standard payment page; and sending the payment information to the second server based on the original payment page address.

In practice, the terminal device scans the target aggregation code. The terminal device or the first server parses the target aggregation code to obtain the first access address that is included in the target aggregation code and that is used to access the second server. The first access address can be an access address specified by the second server. The second server can process a payment request for the target aggregation code based on access of the first server or the terminal device to the first access address. The second server or another server specified by the second server can generate the payment page corresponding to the target aggregation code for the access of the first server or the terminal device to the first access address. Here, the payment page that corresponds to the target aggregation code and that can be generated by the second server or the another server specified by the second server for the access of the first server or the terminal device to the first access address becomes an original payment page. In the existing technology, the user fills in the payment information on the original payment page, and the payment information can be fed back to the second server based on an address of the original payment page.

To ensure that the payment information filled in by the user on the standard payment page can be accurately fed back to the second server to successfully complete the aggregation payment, in this embodiment of this specification, the first server can obtain the payment information input by the user on the standard payment page, and feed back the payment information to the second server based on an original path provided by the second server. As such, the second server side can still process the aggregation payment in an original processing method, and no change is needed. The user can also perform the aggregation payment based on the standard payment page.

In practice, the step of providing the standard payment page to the terminal device by the first server can be processed in parallel with an interaction process between the first server and the second server. As such, a speed of obtaining the payment page by the user of the terminal device can be increased.

It can be understood that the step of providing the standard payment page to the terminal device by the first server can alternatively be asynchronous to the interaction process between the first server and the second server. For example, the standard payment page can be first provided to the user. In a process of filling in the payment information by the user, the first server can also interact with the second service, to obtain the payment page generated by the second server based on the code information that is provided by the current terminal device and that is obtained by the first server. As such, a speed of obtaining the payment page by the user of the terminal device can also be increased.

To further ensure information security and accurate transmission, in this embodiment of this specification, it can be further determined, based on whether the address of the payment page changes, whether to perform information transmission. Specifically, in this embodiment of this specification, before the payment information is sent to the second server, the method can further include: obtaining a historical payment page address corresponding to the historical payment page; determining, based on the historical payment page address, a first interface address used to receive historical payment information; determining, based on the original payment page address, a second interface address used to receive the payment information; and determining whether the first interface address is same as the second interface address, to obtain a second determining result. The sending the payment information to the second server specifically includes: sending the payment information to the second server based on the first interface address or the second interface address if the second determining result indicates that the first interface address is same as the second interface address.

Generally, the target aggregation code is scanned by using the same payment application, and in this case, an interface address provided by the second service for receiving the payment information should be unchanged. The interface address can change when the second server is unstable or there is interference from an unauthorized user, etc. In this embodiment of this specification, an interface change can be monitored based on historical interface information in the historical payment page address. Therefore, possible risks can be found in a timely manner, and transaction security can be improved.

It can be understood that, in practice, interface information used to receive the payment information can also change because payment modes of the aggregation payment on the second server side are different. In this embodiment of this specification, the user can be prompted to rescan the code when the interface information changes. Specifically, prompt information used to prompt the user to rescan the code is sent to the terminal device if the first interface address is different from the second interface address.

At least one of the code information in the predetermined database and a correspondence between the code information and the standard page element can be further deleted if the first interface address is different from the second interface address.

In practice, after receiving the payment information used to perform the aggregation payment, the second server submits an order creation request to the first server so the first server creates a transaction order and completes a transaction based on the order. Specifically, in this embodiment of this specification, after the payment information is sent to the second server, the method can further include: receiving the order creation request sent by the second server based on the payment information, where the order creation request includes first payee identification information of a current payee, payer identification information, and the payment information; creating a transaction order for the target aggregation code based on the order creation request; and completing the aggregation payment for the target aggregation code based on the transaction order.

The current payee can be a payee determined for the target aggregation code scanned by the current terminal device in a process in which the second server generates the original payment page address for the current payment process based on the first access address accessed by the first server. The second server includes information needed for order creating, such as the first payee identification information of the current payee, the payer identification information provided by the first server in a process of obtaining the original payment page address, and the payment information provided by the first server, and sends the order creation request to the first server. The first server can create a transaction order corresponding to a payer and the payee based on the request of the second server.

The first server can further generate an order number when creating the order, and can further send the order number to the second server for the record keeping of the second server. The first server can also save related information of the created order. In this embodiment of this specification, the first server can further save a correspondence between code information and related information of an order, for example, save a correspondence between code information and an order number.

To ensure transaction accuracy, order information can further be checked in this embodiment of this specification. Specifically, in an implementation of this specification, before the aggregation payment for the target aggregation code is completed based on the transaction order, the method can further include: querying a historical transaction order corresponding to the historical payment page; obtaining second payee identification information of a historical payee corresponding to the historical transaction order; determining whether the first payee identification information of the current payee is same as the second payee identification information of the historical payee, to obtain a third determining result; and sending prompt information used to prompt the user to rescan the target aggregation code to the terminal device if the third determining result indicates that the first payee identification information is different from the second payee identification information.

In practice, a correspondence between code information and a payee can be confused due to a network fault, a server fault, an unlawful intrusion, etc. In this embodiment of this specification, the transaction can be interrupted in a timely manner when the information about the current payee is different from the information about the payee in the historical transaction order corresponding to the target aggregation code, and the user is prompted to rescan the aggregation code.

The historical transaction order can be the most recent historical transaction order from a current transaction order before the current transaction order is created, and the historical transaction order can be a historical transaction order that succeeds. The historical payee is a payee in the historical transaction order. Generally, a payee corresponding to the same target aggregation code remains unchanged. The aggregation code usually needs to be changed if the payee is changed. It can be understood that, in implementation application, the payee information corresponding to the target aggregation code can be changed by a management organization of the target aggregation code based on a demand of the merchant. In this case, the user can also rescan to complete the aggregation payment.

In this embodiment of this specification, at least one of the code information in the predetermined database and the correspondence between the code information and the standard page element can be further deleted if the first payee identification information is different from the second payee identification information.

As an implementation, in this embodiment of this specification, the completing aggregation payment for the target aggregation code based on the transaction order specifically includes: sending a password input page to the terminal device if the third determining result indicates that the first payee identification information is same as the second payee identification information; obtaining a payment password input by the user on the password input page; and completing the aggregation payment based on the payment password. It can be further determined whether the payment password is correct, and the aggregation payment is completed when the payment password is correct.

In this embodiment of this specification, the user can be requested to input the payment password when it is determined that the transaction can be performed. The aggregation payment can be completed if the password input by the user is a predetermined password.

In practice, the historical payment page provided by the second server can include a password entry. In this case, the standard payment page generated based on the historical payment page can also include the password entry. That is, the user can input the payment amount and the payment password on the displayed standard payment page. As an implementation, the completing aggregation payment for the target aggregation code based on the transaction order specifically includes: obtaining a payment password input by the user on the standard payment page if the third determining result indicates that the first payee identification information is same as the second payee identification information; and completing the aggregation payment based on the payment password.

In practice, when the user sets password-free payment, as an implementation, the completing aggregation payment for the target aggregation code based on the transaction order specifically includes: completing the aggregation payment if the third determining result indicates that the first payee identification information is same as the second payee identification information.

Before the aggregation payment is completed, a query page used to query the user whether to use the password-free payment can be further sent to the terminal device. Confirmation information indicating that the user determines to use the password-free payment can be obtained if the user determines to use the password-free payment. The aggregation payment is completed based on the determining information.

In this embodiment of this specification, the page information obtained based on the historical payment page and the code information can be pre-stored in the database. Information for generating the standard payment page is queried from the predetermined database after the code information of the target aggregation code scanned by the terminal device is received. Specifically, in this embodiment of this specification, before the step of obtaining a standard payment page in a predetermined format corresponding to the code information, the method can further include: determining whether the code information exists in the predetermined database, where the predetermined database saves at least one piece of pre-saved code information that can generate the standard payment page and a standard payment page corresponding to the pre-saved code information; and executing a procedure of requesting the second server to provide the payment page corresponding to the target aggregation code if the code information does not exist in the predetermined database. The step of obtaining a standard payment page in a predetermined format corresponding to the code information can specifically include: obtaining the standard payment page in the predetermined format corresponding to the code information from the predetermined database if the code information exists in the predetermined database.

In practice, some merchants can be selected in advance as target merchants, and code information of a target aggregation code corresponding to the target merchant is saved to the predetermined database. A standard payment page is provided for at least some consumers of the target merchant, which can also improve consumer experience for the target merchant.

To improve efficiency and increase a success rate of obtaining the payment page by the terminal device of the user, in this embodiment of this specification, the first server can interact with the second server in place of the terminal device. The first server with good performance is used to obtain the payment page provided by the second server, and then send the payment page to the terminal device. Therefore, interaction between the terminal device and the second server can be reduced, and a case in which the terminal device cannot successfully obtain the payment page due to reasons such as a network of the terminal device or performance of the terminal device can be reduced. Specifically, in this embodiment of this specification, the executing a procedure of requesting the second server to provide the payment page corresponding to the target aggregation code specifically includes: obtaining a predetermined access address included in the code information, where the predetermined access address is an access address pre-specified by the second server; sending the payment request for the target aggregation code to the second server based on the predetermined access address; obtaining an aggregation payment page fed back by the second server based on the payment request; and sending the aggregation payment page to the terminal device.

In practice, the code information of the target aggregation code includes an access address specified by the second server. In the existing technology, the terminal device (for example, a browser in the terminal device) interacts with the second server after the user scans the aggregation payment code, to obtain the payment page provided by the server. To complete the payment, the second server needs to query payer information from the terminal device. To obtain the payer information, the terminal device needs to query the payer information from the first server, for example, a server of a payment application program used by the terminal device, and then sends the payer information to the second server. In addition, the second server can further perform, based on the predetermined access address included in the code information, a plurality of times of 302 redirects before the second server queries the payer information from the terminal device. In this case, the terminal device needs to exchange information with a server of the management organization of the aggregation payment code a plurality of times to obtain the payment page. However, due to a limitation on a network signal of the terminal device, for example, a poor network signal of the terminal device, an access failure can occur due to reasons such as an access timeout. In this case, the terminal device cannot successfully obtain the payment page, and a success rate of obtaining the payment page by the terminal device is worse, affecting a payment success rate and user experience. A 302 redirect is a type of web address redirection, and represents a temporary direction of a web address and temporarily directing to another web address.

In this embodiment of this specification, the first server can access, in place of the terminal device, at least one 302 access address provided by the second server. In a process of obtaining the payment page provided by the second server, the terminal device does not need to interact with the second server, and does not need to process an address redirected by the second server in the process of obtaining the payment page. Therefore, the terminal device does not need to process a redirected page, thereby reducing a probability that the payment page cannot be successfully obtained due to an excessive quantity of times of interaction between the terminal device and the second server or the reason of the network of the terminal device, and increasing a success rate of the aggregation payment.

As an implementation, in this embodiment of this specification, after the payment request for the target aggregation code is sent to the second server based on the predetermined access address, the method can further include: receiving a first request including a first redirect address, where the first redirect address points to a management organization of a collection account corresponding to the target aggregation code, and the first redirect address is generated based on the predetermined access address; accessing the first redirect address; receiving a request that is sent by the second server and that is used to obtain account information of a payment account, where the request includes a second redirect address, the second redirect address is generated or determined by the second server based on the first redirect address accessed by the first server, and the second redirect address corresponds to a payment application program provided by the first server; accessing the second redirect address, and sending an authorization code of the payment account to the second redirect address so the second server obtains the authorization code of the payment account; and receiving a payment page address generated by the second server based on the authorization code. The obtaining an aggregation payment page fed back by the second server based on the payment request specifically includes: obtaining the aggregation payment page based on the payment page address.

In this embodiment of this specification, after the prompt information used to prompt the user to rescan the target aggregation code is sent to the terminal device, and after the user rescans the target aggregation code, the first server can obtain code information obtained after the user rescans the target aggregation code, or can execute the previous procedure of requesting the second server to provide the payment page corresponding to the target aggregation code.

To more accurately obtain the payment page, the user can also obtain, in a manner of interaction between the terminal device and the second server, the aggregation payment page provided by the second server after rescanning the target aggregation code. A specific case can be set based on an actual need, and is not specifically limited here.

To describe the method for sending an aggregation-code-based payment page provided in the embodiments of this specification more clearly, FIG. 5 is a swimlane diagram illustrating a method for sending an aggregation-code-based payment page, according to an embodiment of this specification. As shown in FIG. 5, the method can include an information acquisition phase, a payment page generation phase, and a page display phase, and can specifically include: Step 502: A terminal device scans a target aggregation code.

For example, during shopping settlement, a user can make payment by scanning an aggregation code provided by a merchant. The user can select any payment mode supported by the aggregation code to make payment. Assume that the aggregation code pays payment mode A, the user can use an application program in the terminal device that can provide payment mode A to scan the aggregation code. The user is usually in a state of being logged in to the application program when the user scans the aggregation code by using the application program. When the user does not log in to the application program, the user can be further prompted to log in to the application program before scanning the code. The terminal device can be a mobile device such as a smartphone, a smartwatch, or a computer.

Step 504: The terminal device obtains code information in the target aggregation code.

Step 506: A first server obtains the code information obtained by scanning the target aggregation code by the terminal device.

The first server can be a server corresponding to the application program when the user scans the target aggregation code by using the application program in the terminal device. The first server can process a related task of the application program.

Step 508: Determine whether the code information exists in a predetermined database. The predetermined database can save at least one piece of pre-saved code information that is determined based on historical payment information and that can generate a standard payment page and a standard payment page corresponding to the pre-saved code information.

Step 510: Obtain the standard payment page in a predetermined format corresponding to the code information from the predetermined database if the code information exists in the predetermined database.

Step 512: Send the standard payment page to the terminal device.

Step 514: Execute a procedure of requesting the second server to provide a payment page corresponding to the target aggregation code if the code information does not exist in the predetermined database.

Step 516: The terminal device obtains the standard payment page sent by the first server and displays the standard payment page.

The method in this specification can further include a payment phase. Specifically, step 518: The user inputs payment information such as a payment amount on the standard payment page.

Step 520: The first server obtains the payment information input by the user.

Step 522: Send the payment information to the second server to complete payment.

Step 524: The second server obtains the payment information.

Step 526: The second server sends an order creation request based on the payment information.

Step 528: The first server creates an order based on the request of the second server.

Step 530: Determine merchant information such as a payee identifier in the order created in a current transaction.

Step 532: Query historical merchant information such as a historical payee identifier in a historical transaction order corresponding to a historical payment page.

Step 534: Determine whether the merchant information in the current order is consistent with the merchant information in the historical order.

Step 536: Continue the transaction if consistent, and send a password input page to the terminal device. Step 514 can be performed if inconsistent.

Step 538: The terminal device displays the password input page, and the user inputs a payment password.

Step 540: Obtain the payment password input by the user to complete current aggregation payment.

Based on the same idea, an embodiment of this specification further provides an apparatus corresponding to the previous method. FIG. 6 is a schematic structural diagram illustrating an apparatus for sending an aggregation-code-based payment page, according to an embodiment of this specification. As shown in FIG. 6, the apparatus can include: an information acquisition module 602, configured to obtain code information obtained by scanning a target aggregation code by a terminal device; a page acquisition module 604, configured to obtain a standard payment page in a prede-termined format corresponding to the code information, where page information included in the standard payment page is obtained by a first server from page information of a historical payment page provided by a second server for the target aggregation code; and a sending module 606, configured to send the standard payment page to the terminal device.

Based on the apparatus in FIG. 6, an embodiment of this specification further provides some specific implementation solutions of the method, which are described below.

Optionally, the apparatus provided in this embodiment of this specification can further include an information crawl-ing module. The information crawling module can be con-figured to obtain the historical payment page that corre-sponds to the target aggregation code and that is provided by the second server; crawl a page element in the historical payment page from the historical payment page; determine a standard page element included in the standard payment page from the page element; and obtain the page information of the standard payment page based on the standard page element.

Based on the same idea, an embodiment of this specifi-cation further provides a device corresponding to the pre-vious method.

FIG. 7 is a schematic structural diagram illustrating a device for sending an aggregation-code-based payment page, according to an embodiment of this specification. As shown in FIG. 7, the device 700 can include at least one processor 710, and a memory 730 communicatively con-nected to the at least one processor. The memory 730 stores instructions 720 that can be executed by the at least one processor 710. The instructions are executed by the at least one processor 710 to enable the at least one processor 710 to: obtain code information obtained by scanning a target aggregation code by a terminal device; obtain a standard payment page in a predetermined format corresponding to the code information, where page information included in the standard payment page is obtained by a first server from page information of a historical payment page provided by a second server for the target aggregation code; and send the standard payment page to the terminal device.

Based on the same idea, an embodiment of this specifi-cation further provides a computer-readable medium corre-sponding to the previous method. The computer-readable medium stores computer-readable instructions, and the com-puter-readable instructions can be executed by a processor to implement the previous method for sending an aggregation-code-based payment page.

The embodiments in this specification are described in a progressive way. For same or similar parts of the embodi-ments, references can be made to the embodiments mutually. Each embodiment focuses on a difference from other embodiments. Particularly, the device shown in FIG. 7 is briefly described since the device is basically similar to some method embodiments. For related parts, references can be made to related descriptions in the method embodiments.

In the 1990s, whether a technical improvement is a hardware improvement (for example, an improvement to a circuit structure, such as a diode, a transistor, or a switch) or a software improvement (an improvement to a method procedure) can be clearly distinguished. However, as tech-nologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is simi-lar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Lan-guage (AHDL), Confluence, the Cornell University Pro-gramming Language (CUPL), HDCal, the Java Hardware Description Language (JHDL), Lava, Lola, MyHDL, the Programmable Array Logic Assembler (PALASM), and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using some described hardware description languages and is programmed into an integrated circuit.

A controller can be implemented by using any appropriate method. For example, the controller can be a microprocessor or a processor, or a computer-readable medium that stores computer-readable program code (such as software or firm-ware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively, the apparatus configured to implement various functions can even be considered as both a software module implementing the method and a structure in the hardware component.

The system, apparatus, module, or unit illustrated in the embodiments can be specifically implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, when this application is implemented, the functions of each unit can be implemented in one or more pieces of at least one of software and hardware.

A person skilled in the art should understand that some embodiments of this application can be provided as a method, a system, or a computer program product. Therefore, this application can use a form of hardware only embodiments, software only embodiments, or embodiments with a combination of software and hardware. Further, this application can take a form of a computer program product implemented on one or more computer-usable storage media (including but not limited to a magnetic disk storage, a compact disc read-only memory (CD-ROM), an optical memory, etc.) containing computer-usable program code.

This application is described with reference to at least one of the flowcharts and block diagrams of the method, the device (system), and the computer program product according to some embodiments of this application. It should be understood that at least one of each process and each block in at least one of the flowcharts and the block diagrams and a combination of at least one of a process and a block in at least one of the flowcharts and block diagrams can be implemented by computer program instructions. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in at least one of one or more processes in the flowcharts and one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in at least one of one or more processes in the flowcharts and one or more blocks in the block diagrams.

These computer program instructions can be loaded onto the computer or the another programmable data processing device, so a series of operations and steps are performed on the computer or the another programmable device, thereby generating computer-implemented processing. Therefore, the instructions executed on the computer or the another programmable device provide steps for implementing a specific function in at least one of one or more processes in the flowcharts and one or more blocks in the block diagrams.

In a typical configuration, a computing device includes one or more processors (for example, a central processing unit (CPU)), an input/output interface, a network interface, and a memory.

The memory can include at least one of a non-persistent memory, a random access memory (RAM), and a non-volatile memory in a computer-readable medium, for example, a read-only memory (ROM) or a flash read-only memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include, but are not limited to, a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, and a cassette magnetic disk storage, or another magnetic storage device or any other non-transmission medium. The computer storage medium can be configured to store information that can be accessed by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that some embodiments of this application can be provided as methods, systems, or computer program products. Therefore, this application can use a form of hardware only embodiments, software only embodiments, or embodiments with a combination of software and hardware. Moreover, this application can use a form of a computer program product that is implemented on one or more computer-usable storage media (including but not limited to a magnetic disk storage, a CD-ROM, an optical memory, etc.) that include computer-usable program code.

This application can be described in a general context of a computer-executable instruction that is executed by a computer, for example, a program module. Generally, the program module includes a routine, a program, an object, a component, a data structure, etc. executing a specific task or implementing a specific abstract data type. This application can alternatively be practiced in distributed computing environments in which tasks are performed by remote processing devices that are connected through a communication network. In the distributed computing environments, the program module can be located in a local and remote computer storage medium including a storage device.

The above-mentioned descriptions are merely some embodiments of this application, and are not intended to limit this application. A person skilled in the art can make various changes and variations to this application. Any modification, equivalent replacement, or improvement made without departing from the spirit and principle of this application shall fall within the scope of the claims in this application.

The invention claimed is:

1. A computer-implemented method, comprising:
   receiving, by a first server from a terminal device, code information obtained by the terminal device from scanning a target aggregation code;
   obtaining, by the first server, a historical payment page from a second server, wherein the historical payment page is provided by the second server for the target aggregation code before the terminal device scanning the target aggregation code;
   obtaining, by the first server, one or more page elements comprised in the historical payment page;
   determining, by the first server, one or more standard page elements from the one or more page elements;
   generating, by the first server, page information of a standard payment page based on the one or more standard page elements;
   obtaining, by the first server, the standard payment page corresponding to the code information based on a predetermined template corresponding to the code information, wherein the standard payment page comprises page information generated by the first server based on the historical payment page, and the predetermined template comprises a display position of a standard page element in the standard payment page, wherein obtaining the standard payment page corresponding to the code information comprises:
   obtaining the predetermined template corresponding to the code information; and
   adding the one or more standard page elements to the standard payment page based on the display position; and
   sending, by the first server to the terminal device, the standard payment page.

2. The method according to claim 1, wherein the historical payment page is a payment page last generated by the second server for the target aggregation code.

3. The method according to claim 1, further comprising:
   receiving a plurality of historical payment pages, wherein the plurality of historical payment pages are generated by the second server in a time period before the first server obtains the code information comprised in the target aggregation code, and
   wherein obtaining the historical payment page from the second server comprises:
      in response to determining that the plurality of historical payment pages have same display content, generating the standard payment page based on at least one of the plurality of historical payment pages.

4. The method according to claim 1, further comprising:
   before sending the standard payment page to the terminal device:
      determining, by the first server, a first address comprised in the code information, wherein the first address is configured to access the second server; and
      obtaining, based on the first address, a second address generated by the second server for a current payment; and
   after sending the standard payment page to the terminal device:
      obtaining payment information of the current payment, wherein the payment information is provided by a user on the standard payment page; and
      sending the payment information to the second server based on the second address.

5. The method according to claim 4, further comprising:
   before sending the standard payment page to the second server:
      obtaining a third address corresponding to the historical payment page;
      determining, based on the third address, a first interface address to receive historical payment information; and
      determining, based on the second address, a second interface address to receive the payment information,
   wherein sending the payment information to the second server based on the second address comprises:
      in response to determining that the first interface address is same as the second interface address, sending the payment information to the second server based on the first interface address or the second interface address.

6. The method according to claim 4, wherein after sending the payment information to the second server based on the second address, the method further comprising:
   receiving a request generated by the second server based on the payment information, wherein the request comprises a first identification of a payee of the current payment, an identification of a payer, and the payment information;
   generating a transaction order for the target aggregation code based on the request; and
   making the current payment based on the transaction order.

7. The method according to claim 6, wherein before making the current payment based on the transaction order, the method further comprising:
   querying a historical transaction order corresponding to the historical payment page;
   obtaining a second identification of a payee of the historical transaction order; and
   in response to determining that the first identification is different from the second identification, sending prompt information to the terminal device, wherein the prompt information prompts the user to rescan the target aggregation code.

8. The method according to claim 7, wherein making the current payment based on the transaction order comprises:
   in response to determining that the first identification is same as the second identification, sending an input page to the terminal device for the user to input a password;
   obtaining the password from the user; and
   making the current payment based on the password.

9. The method according to claim 1, wherein, before obtaining the standard payment page corresponding to the code information, the method further comprises:

in response to determining that the code information is absent in a predetermined database, requesting the second server to provide a payment page corresponding to the target aggregation code, wherein obtaining the standard payment page corresponding to the code information comprises:

in response to determining that predetermined database comprises the code information, obtaining the standard payment page from the predetermined database.

10. The method according to claim 9, wherein requesting the second server to provide the payment page corresponding to the target aggregation code comprises:

obtaining an access address comprised in the code information, wherein the access address is pre-specified by the second server;

sending a payment request for the target aggregation code to the second server based on the access address;

obtaining the payment page from the second server based on the payment request; and sending the payment page to the terminal device.

11. A non-transitory, computer-readable medium storing one or more instructions executable by a computer system to perform operations comprising:

receiving, by a first server from a terminal device, code information obtained by the terminal device from scanning a target aggregation code;

obtaining, by the first server, a historical payment page from a second server, wherein the historical payment page is provided by the second server for the target aggregation code before the terminal device scanning the target aggregation code;

obtaining, by the first server, one or more page elements comprised in the historical payment page;

determining, by the first server, one or more standard page elements from the one or more page elements;

generating, by the first server, page information of a standard payment page based on the one or more standard page elements;

obtaining, by the first server, the standard payment page corresponding to the code information based on a predetermined template corresponding to the code information, wherein the standard payment page comprises page information generated by the first server based on the historical payment page, the predetermined template comprises a display position of a standard page element in the standard payment page, wherein obtaining the standard payment page corresponding to the code information comprises:

obtaining the predetermined template corresponding to the code information; and adding the one or more standard page elements to the standard payment page based on the display position; and sending, by the first server to the terminal device, the standard payment page.

12. The non-transitory, computer-readable medium of claim 11, wherein the historical payment page is a payment page last generated by the second server for the target aggregation code.

13. The non-transitory, computer-readable medium of claim 11, wherein the operations further comprise:

receiving a plurality of historical payment pages, wherein the plurality of historical payment pages are generated by the second server in a time period before the first server obtains the code information comprised in the target aggregation code, and wherein obtaining the historical payment page from the second server comprises:

in response to determining that determining that the plurality of historical payment pages have same display content, generating the standard payment page based on at least one of the plurality of historical payment pages.

14. The non-transitory, computer-readable medium of claim 11, wherein before obtaining the standard payment page corresponding to the code information, the operations further comprise:

in response to determining that the code information is absent in a predetermined database, requesting the second server to provide a payment page corresponding to the target aggregation code, wherein obtaining the standard payment page corresponding to the code information comprises:

in response to determining that predetermined database comprises the code information, obtaining the standard payment page from the predetermined database.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a first server from a terminal device, code information obtained by the terminal device from scanning a target aggregation code;

obtaining, by the first server, a historical payment page from a second server, wherein the historical payment page is provided by the second server for the target aggregation code before the terminal device scanning the target aggregation code;

obtaining, by the first server, one or more page elements comprised in the historical payment page;

determining, by the first server, one or more standard page elements from the one or more page elements;

generating, by the first server, page information of a standard payment page based on the one or more standard page elements;

obtaining, by the first server, the standard payment page corresponding to the code information based on a predetermined template corresponding to the code information, wherein the standard payment page comprises page information generated by the first server based on the historical payment page, the predetermined template comprises a display position of a standard page element in the standard payment page, wherein obtaining the standard payment page corresponding to the code information comprises:

obtaining the predetermined template corresponding to the code information; and adding the one or more standard page elements to the standard payment page based on the display position; and sending, by the first server to the terminal device, the standard payment page.

16. The computer-implemented system of claim 15, wherein the one or more operations further comprise:

before the standard payment page to the terminal device:

determining, by the first server, a first address comprised in the code information, wherein the first address is configured to access the second server; and obtaining, based on the first address, a second address generated by the second server for a current payment; and after sending the standard payment page to the terminal device:

obtaining payment information of the current payment, wherein the payment information is provided from a user on the standard payment page; and sending the payment information to the second server based on the second address.

17. The computer-implemented system of claim 16, wherein the one or more operations further comprise:

before sending the standard payment page to the terminal device:

obtaining a third address corresponding to the historical payment page;

determining, based on the third address, a first interface address to receive historical payment information;

determining, based on the second address, a second interface address to receive the payment information; and determining whether the first interface address is same as the second interface address, to obtain a second determining result, wherein sending the payment information to the second server based on the second address comprises:

in response to determining that the first interface address is same as the second interface address, sending the payment information to the second server based on the first interface address or the second interface address.

\* \* \* \* \*